United States Patent
Cho et al.

(10) Patent No.: US 12,489,597 B2
(45) Date of Patent: Dec. 2, 2025

(54) RECEIVING DEVICE AND OPERATING METHOD THEREOF

(71) Applicant: SAMSUNG ELECTRONICS CO., LTD., Suwon-si (KR)

(72) Inventors: Byungwook Cho, Suwon-si (KR); Subin Yim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 18/241,565

(22) Filed: Sep. 1, 2023

(65) Prior Publication Data

US 2024/0259176 A1    Aug. 1, 2024

(30) Foreign Application Priority Data

Jan. 27, 2023   (KR) .......................... 10-2023-0011105

(51) Int. Cl.
    *H04L 7/00*           (2006.01)

(52) U.S. Cl.
    CPC .......... *H04L 7/0025* (2013.01); *H04L 7/0037* (2013.01); *H04L 7/0087* (2013.01)

(58) Field of Classification Search
    CPC ..................................................... H04L 7/0025
    USPC ....................................................... 375/355
    See application file for complete search history.

(56) References Cited

U.S. PATENT DOCUMENTS

| | | | |
|---|---|---|---|
| 8,126,039 B2 | 2/2012 | Mobin et al. | |
| 8,238,503 B2 | 8/2012 | Noguchi | |
| 8,649,476 B2 | 2/2014 | Malipatil et al. | |
| 9,800,438 B1 | 10/2017 | Zhang et al. | |
| 10,142,089 B2 | 11/2018 | Yao et al. | |
| 10,466,301 B1 | 11/2019 | Lee et al. | |
| 11,070,351 B1 | 7/2021 | Chepuri | |
| 11,139,949 B2 | 10/2021 | Nodenot et al. | |
| 11,451,250 B1 | 9/2022 | Dedic et al. | |
| 11,463,092 B1 | 10/2022 | Gharibdoust et al. | |
| 2006/0280272 A1 | 12/2006 | Stojanovic | |
| 2014/0070859 A1* | 3/2014 | Waltari | H03L 7/091 327/158 |
| 2022/0140837 A1 | 5/2022 | Xu | |
| 2023/0299783 A1* | 9/2023 | Araki | H03M 1/1028 341/120 |

OTHER PUBLICATIONS

Communication issued on Mar. 22, 2024 by the European Patent Office in European Patent Application No. 23200224.6.

* cited by examiner

*Primary Examiner* — Lihong Yu
(74) *Attorney, Agent, or Firm* — Sughrue Mion, PLLC

(57) ABSTRACT

A receiving device includes a delay buffer configured to receive an analog signal and output a delayed analog signal, a phase interpolator configured to output a clock signal based on a phase compensation code signal and a reference clock signal, an analog-to-digital converter group configured to output a slope type determination signal indicating a slope of the analog signal based on the analog signal and the delayed analog signal, and a clock data restorer. The clock data restorer is configured to determine a curve type associated with a plurality of digital samples from the analog-to-digital converter group. The clock data restorer also evaluates a timing of the clock signal based on the curve type and the slope type determination signal, and outputs the phase compensation code signal to move the sample timing closer to an optimum timing.

15 Claims, 17 Drawing Sheets

SLOPE_DET1 = sgn[DATA_DELAY1−DATA_DELAY2]
SLOPE_DET2 = sgn[DATA_DELAY2−DATA_DELAY1]

RECEIVING DEVICE AND OPERATING METHOD THEREOF

CROSS-REFERENCE TO RELATED APPLICATION

This application is based on and claims priority under 35 U.S.C. § 119 to Korean Patent Application No. 10-2023-0011105, filed on Jan. 27, 2023, in the Korean Intellectual Property Office, the disclosure of which is incorporated by reference herein in its entirety.

BACKGROUND

The present disclosure relates to an electronic device, and more particularly to, a receiving device capable of evaluating timing of a clock using outputs of an analog-to-digital converter and an operating method of the receiving device.

As the operating speed of semiconductor devices has been gradually increased, an increase in the speed of communication between devices is required. For increased communication speed between devices, communication using signals having various signal levels has been used.

In communication between devices, when a timing skew of a clock occurs due to an environmental problem in transmitting and receiving a signal according to a clock, the reliability of signal communication deteriorates. Therefore, for reliable data communication, adjusting the timing skew of the clock is required. Research has been conducted on adjusting the timing skew in a communication environment using multi-level signals.

To adjust the timing of a clock with low power, a method of detecting the phase of the clock such as Mueller-Muller Phase Detection (MMPD), which is mainly used in baud-rate CDR, is used, but in the case of MMPD, equalizer output may be required. However, in the loop connected to the Analog-to-Digital Converter (ADC), Equalizer (and Adaptation), Clock and Data Recovery (CDR), and Phase Interpolator (PI), since the search for the optimal timing for the clock has an impact, latency may occur accordingly.

SUMMARY

Embodiments provide a receiving device capable of evaluating the timing of a clock using outputs of an analog-to-digital converter without using an output of an equalizer, and an operating method of the receiving device.

According to an aspect of an embodiment, a receiving device includes: a delay buffer configured to receive an analog signal and output a delayed analog signal delayed with respect to the analog signal; a phase interpolator configured to output, based on a phase compensation code signal and a reference clock signal, a clock signal: an analog-to-digital converter group configured to: output, based on the analog signal and the clock signal, a plurality of digital samples, wherein the plurality of digital samples includes a first digital sample with a first value, a second digital sample with a second value and a third digital sample with a third value, and output, based on the analog signal and the delayed analog signal, a slope type determination signal, wherein the slope type determination signal indicates a rising slope or a falling slope of the analog signal; and a clock data restorer configured to: determine, based on the plurality of digital samples, a curve type indicating a convex curve or a concave curve, obtain, based on the curve type and the slope type determination signal, an evaluation result with respect to a timing of the clock signal, and output, based on the evaluation result, the phase compensation code signal.

According to an aspect of an embodiment, an operating method of a receiving device, includes: delaying an analog signal received from the outside to output a delayed analog signal delayed with respect to the analog signal; outputting, based on a phase compensation code signal and a reference clock signal, a clock signal; outputting, based on the analog signal and the clock signal, a plurality of digital samples, wherein the plurality of digital samples includes a first digital sample with a first value, a second digital sample with a second value and a third digital sample with a third value; outputting, based on the clock signal, the analog signal and the delayed analog signal, a slope type determination signal, wherein the slope type determination signal indicates a rising slope or a falling slope of the analog signal; determining, based on the plurality of digital samples, a curve type indicating a convex curve or a concave curve; obtaining, based on the curve type and the slope type determination signal, an evaluation result with respect to a timing of the clock signal; and outputting, based on the evaluation result, the phase compensation code signal.

According to an aspect of an embodiment, a receiving device includes: a first phase interpolator configured to output, based on a first phase compensation code signal and a reference clock signal, a first clock signal: a second phase interpolator configured to output, based on a second phase compensation code signal and the reference clock signal, a second clock signal delayed with respect to the first clock signal; an analog-to-digital converter group configured to output a plurality of digital samples by sampling an analog signal in response to the first clock signal; a test analog-to-digital converter configured to: sample the analog signal in response to the second clock signal, and output a second digital sample; and a clock data restorer configured to: determine, based on a first digital sample and the second digital sample selected from among the plurality of digital samples, a slope type indicating a rising slope or a falling slope of the analog signal, determine, based on the plurality of digital samples, a curve type indicating a convex curve or a concave curve, obtain, based on the curve type and the slope type, an evaluation result with respect to a timing of the first clock signal, and output, based on the evaluation result, the first phase compensation code signal as a first feedback signal and the second phase compensation code signal as a second feedback signal.

According to an aspect of an embodiment, an operating method of a receiving device, includes: outputting, based on a first phase compensation code signal and a reference clock signal, a first clock signal; outputting a plurality of digital samples by sampling, with the first clock signal, an analog signal received from an outside, wherein the plurality of digital samples includes a first digital sample; outputting, based on a second phase compensation code signal and the reference clock signal, a second clock signal delayed with respect to the first clock signal: outputting a second digital sample by sampling, with the second clock signal, the analog signal; determining, based on the first digital sample and the second digital sample, a slope type indicating a rising slope or a falling slope of the analog signal; determining, based on at least the first digital sample and the second digital sample, a curve type indicating a convex curve or a concave curve; obtaining, based on the slope type and the curve type, an evaluation result with respect to a timing of the first clock signal; and outputting, based on the evaluation result, the first phase compensation code signal and the second phase compensation code signal.

BRIEF DESCRIPTION OF THE DRAWINGS

The above and/or other aspects will be more clearly understood from the following detailed description of certain embodiments taken in conjunction with the accompanying drawings, in which.

DETAILED DESCRIPTION

Hereinafter, embodiments will be described in detail with reference to the accompanying drawings.

Figure 1:
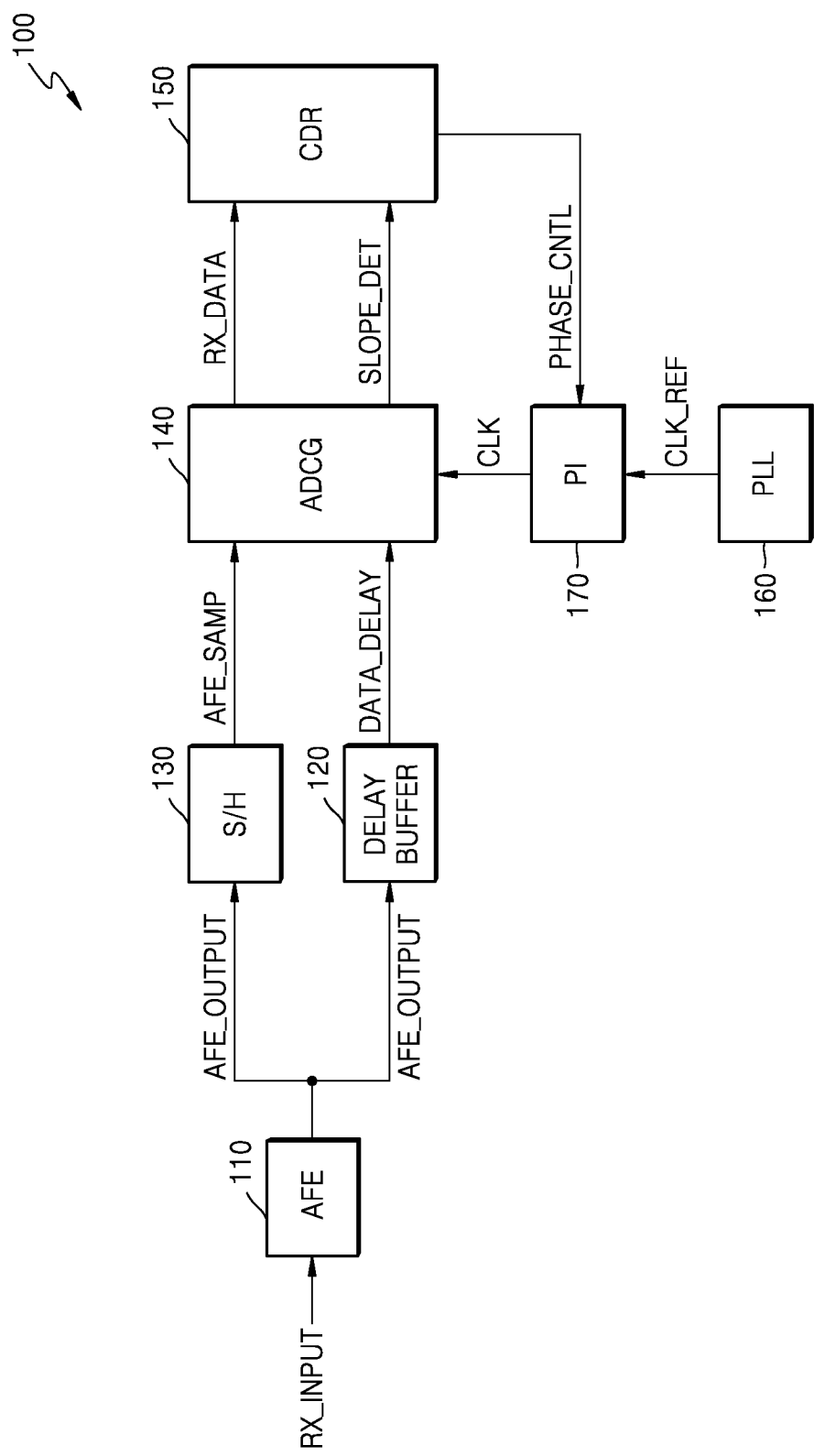
FIG. 1 is a block diagram illustrating a receiving device according to some embodiments.

FIG. 1 is a block diagram illustrating a receiving device according to some embodiments.

Referring to FIG. 1, a receiving device 100 may be a device that receives an analog signal from an external transmission device through a channel and processes the received analog signal into a digital signal. The receiving device 100 according to some embodiments may include an analog front end 110, a delay buffer 120, a sampling and holding circuit 130, an analog-to-digital converter group 140, a clock data restorer 150, a phase synchronization circuit 160, and a phase interpolator 170.

The analog front end 110 may receive an input signal RX_INPUT from the outside. The analog front end 110 may amplify the received input signal RX_INPUT. The analog front end 110 may output the amplified input signal AFE_OUTPUT. In one embodiment, the amplified input signal AFE_OUTPUT may be input to the sampling and holding circuit 130 and the delay buffer 120. In another embodiment, the amplified input signal AFE_OUTPUT may be input to the delay buffer 120 and the analog-to-digital converter group 140. Meanwhile, the analog front end 110 may adjust the received input signal RX_INPUT.

In some embodiments, the analog front end 110 may include a Continuous Time Linear Equalization (CTLE) and a Variable Gain Amplifier (VGA) consisting of multiple stages.

The delay buffer 120 may receive the amplified input signal AFE_OUTPUT. The delay buffer 120 may output the delayed input signal DATA_DELAY delayed beyond the amplified input signal AFE_OUTPUT to the analog-to-digital converter group 140.

The sampling and holding circuit 130 may sample the amplified input signal AFE_OUTPUT and output the sampled signal AFE_SAMP to the analog-to-digital converter group 140. In some embodiments, the sampling and holding circuit 130 may not be included in the receiving device 100. According to this, the amplified input signal AFE_OUTPUT may be directly transferred to the analog-to-digital converter group 140.

The input signal RX_INPUT and the amplified input signal AFE_OUTPUT according to embodiments may correspond to analog signals. According to this, the delayed input signal DATA_DELAY may be referred to as a delayed analog signal. Hereinafter, the analog signal may be an input signal RX_INPUT, an amplified input signal AFE_OUTPUT, or a sampled signal AFE_SAMP as needed.

The analog-to-digital converter group 140 may output a plurality of digital samples RX_DATA based on the analog signal and the clock signal CLK.

The analog-to-digital converter group 140 may output the slope type determination signal SLOPE_DET based on the clock signal CLK, the analog signal, and the delay analog signal (e.g., the delayed input signal DATA_DELAY). The slope type determination signal SLOPE_DET may be a signal indicating a rising or falling slope of the analog signal.

In the embodiments, rising or falling of a slope may be referred to as a slope type. In some embodiments, the slope type may be represented by different logic levels that the slope type determination signal SLOPE_DET may have. For example, if the slope type determination signal SLOPE_DET is the first logic level, the slope type may be rising, and if the slope type determination signal SLOPE_DET is the second logic level, the slope type may be falling. However, the embodiments are not limited thereto.

The analog-to-digital converter group 140 may include one or more analog-to-digital converters that output each digital sample and each slope type determination signal.

The clock data restorer 150 may restore data and clock based on the plurality of digital samples RX_DATA and the slope type determination signal SLOPE_DET.

The clock data restorer 150 may output the phase compensation code signal PHASE_CNTRL for adjusting the timing of the clock signal CLK to the phase interpolator 170 based on a plurality of digital samples RX_DATA and a slope type determination signal SLOPE_DET.

Specifically, the clock data restorer 150 may determine a curve type based on a plurality of digital samples RX_DATA. The curve type may represent the convex or concave curve of at least some digital samples among the plurality of digital samples RX_DATA. Here, the convexity of the curve may refer to a curve in which the slope of a tangent line decreases from a positive number to a negative number on a two-dimensional plane. Meanwhile, the concave curve may refer to a curve in which a slope of a tangent line increases from a negative number to a positive number on a two-dimensional plane. The clock data restorer 150 may evaluate the timing of the clock signal CLK based on the curve type and slope type determination signal SLOPE_DET. Also, the clock data restorer 150 may output a phase compensation code signal PHASE_CNTRL according to the evaluation result.

The phase synchronization circuit 160 may output the reference clock signal CLK_REF to the phase interpolator 170. The reference clock signal CLK_REF may include, for example, pulse signals having four different phases.

The phase interpolator 170 may output the clock signal CLK to the analog-to-digital converter group 140 based on the phase compensation code signal PHASE_CNTRL and the reference clock signal CLK_REF.

Although not shown, the receiving device 100 may further include an equalizer. The equalizer and clock data restorer 150 may be implemented as a digital signal processor (DSP) within the receiving device 100.

As described above, by evaluating the timing of the clock using the output values of the analog-to-digital converter without using the output of the equalizer, this has the effect of reducing loop latency.

As described above, by evaluating the clock timing without using the output of the equalizer, there is an effect of preventing excessive occurrence of jitter or JTOL.

As described above, the phase of the clock is stably detected by evaluating the timing of the clock using the slope of the analog signal and the curve type of the digital samples.

Figure 2:
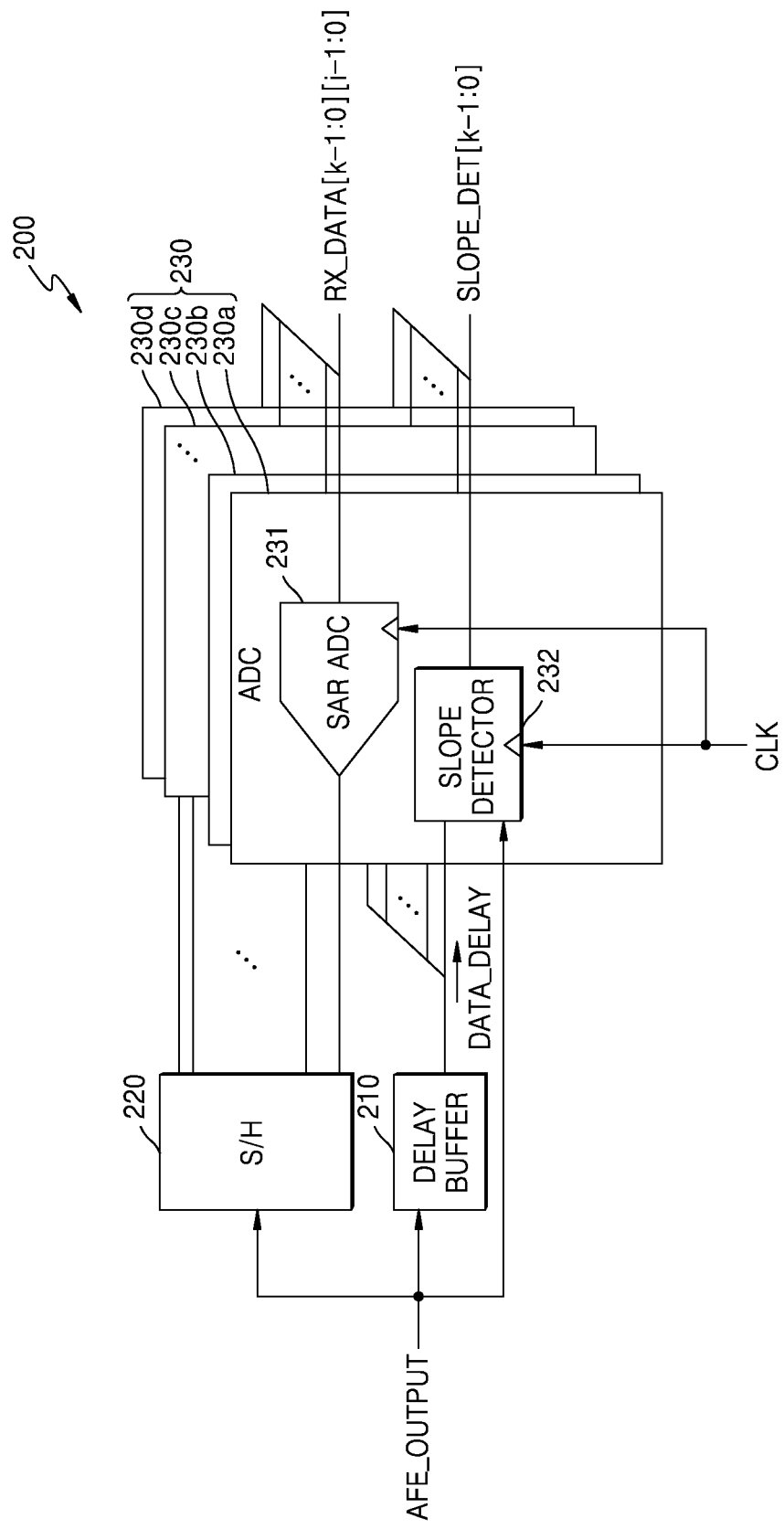
FIG. 2 is a block diagram illustrating an analog-to-digital converter group according to example embodiments.

FIG. 2 is a block diagram illustrating an analog-to-digital converter group according to exemplary embodiments.

Referring to FIG. 2, in the receiving device 200, the amplified input signal AFE_OUTPUT may be provided to the delay buffer 210, the sampling and holding circuit 220, and the analog-to-digital converter group 230.

The analog-to-digital converter group 230 may include a plurality of analog-to-digital converters 230a, 230b, 230c, and 230d. The number of the plurality of analog-to-digital converters 230a, 230b, 230c, and 230d may be k. k may be an integer of 2 or more. For example, the analog-to-digital converter group 230 may include 32 analog-to-digital converters. However, the embodiments are not limited thereto.

The analog-to-digital converter group 230 may output k digital samples RX_DATA[k−1:0][i−1:0]. Here, "[k−1:0]" in FIG. 2 is a mark for indicating k analog-to-digital converters, and "[i−1:0]" in FIG. 2 may be a mark indicating the word length of a digital sample output from one analog-to-digital converter. In this case, i may be an integer of 2 or more. If i is 7, one analog-to-digital converter may output 7-bit digital samples.

The analog-to-digital converter group 230 may also output a plurality of slope type determination signals SLOPE_DET[k−1:0].

Each analog-to-digital converter included in the analog-to-digital converter group 230, for example, the analog-to-digital converter 230a may include a successive approximation register analog-to-digital converter 231 and a slope detector 232. Each of the other analog-to-digital converters 230b, 230c, and 230d may also include a successive approximation register analog-to-digital converter and a slope detector.

The successive approximation register analog-to-digital converter 231 may be connected to the sampling and holding circuit 220. The successive approximation register analog-to-digital converter 231 may output a digital sample RX_DATA[x][i−1:0] by sampling an analog signal in response to an edge of the clock signal CLK. The successive approximation register analog-to-digital converter 231 may also be referred to as a sequential comparison type analog-to-digital converter or a SAR ADC. The number of bits representing one digital sample may be i.

The slope detector 232 may receive the delayed input signal DATA_DELAY from the delay buffer 210 through one input terminal. The slope detector 232 may receive the amplified input signal AFE_OUTPUT through another input terminal. The slope detector 232 may output a result of comparing the level of the analog signal (e.g., the level of the amplified input signal AFE_OUTPUT) and the level of the delayed analog signal (e.g., the level of the delayed input signal DATA_DELAY) as a slope type determination signal (SLOPE_DET[x]) in response to an edge of the clock signal CLK.

Figure 3:
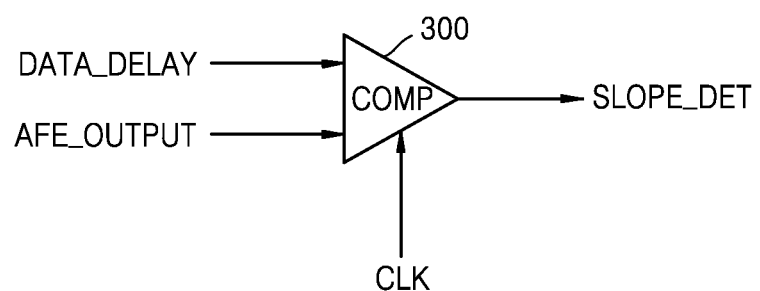
FIG. 3 is a diagram illustrating a slope detector according to an embodiment.

FIG. 3 is a diagram illustrating a slope detector according to an embodiment.

Referring to FIG. 3, the slope detector 300 may be implemented as a comparator. The slope detector 300 implemented as a comparator may receive an analog signal and a delay analog signal through input terminals. For example, the slope detector 300 may receive a delayed input signal DATA_DELAY through a first input terminal and receive an amplified input signal AFE_OUTPUT through a second input terminal.

The slope detector 300 implemented as a comparator may compare the level of the analog signal and the level of the delayed analog signal at the edge of the clock signal CLK. For example, the slope detector 300 may compare whether the level of the delayed input signal DATA_DELAY is greater than the level of the amplified input signal AFE_OUTPUT at every edge of the clock signal CLK. For another example, the slope detector 300 may compare whether the level of the delayed input signal DATA_DELAY is less than the level of the amplified input signal AFE_OUTPUT at every edge of the clock signal CLK.

The slope detector 300 implemented as a comparator may output a signal having any one logic level among different logic levels corresponding to the comparison result as a slope type determination signal SLOPE_DET.

The slope type determination signal SLOPE_DET may have a first logic level or a second logic level. In some embodiments, a first logic level may indicate that the type of slope is rising and a second logic level may indicate that the type of slope is falling. However, the embodiments are not limited thereto. If the first logic level is a logic high level, the second logic level may be a logic low level. However, the embodiments are not limited thereto.

Although not shown, in another embodiment, the slope detector may be implemented as a sense amplifier.

Figure 4A:
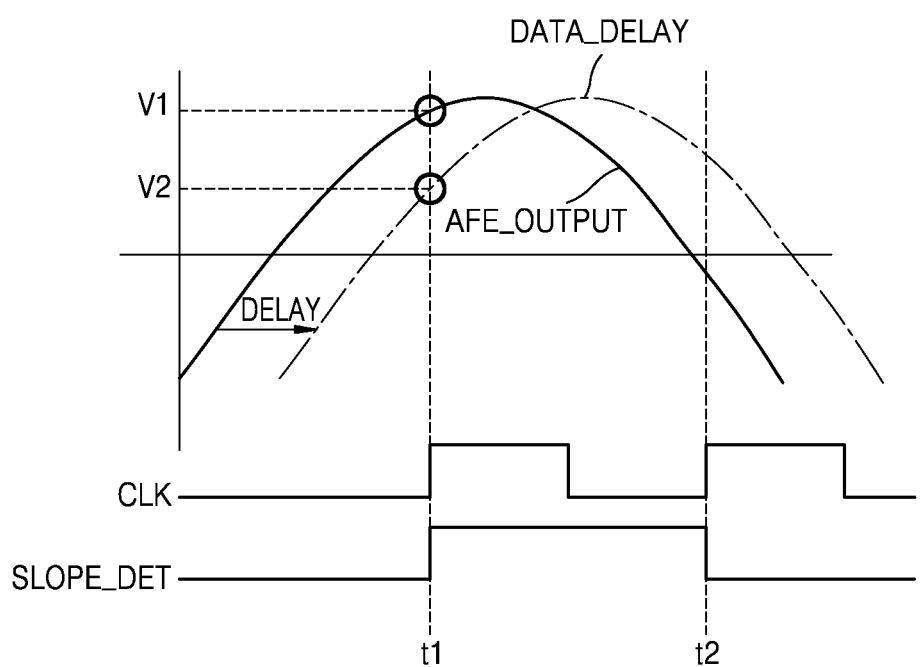
FIGS. 4A and 4B are diagrams for explaining the operation of the slope detector of FIG. 3.
Figure 4B:
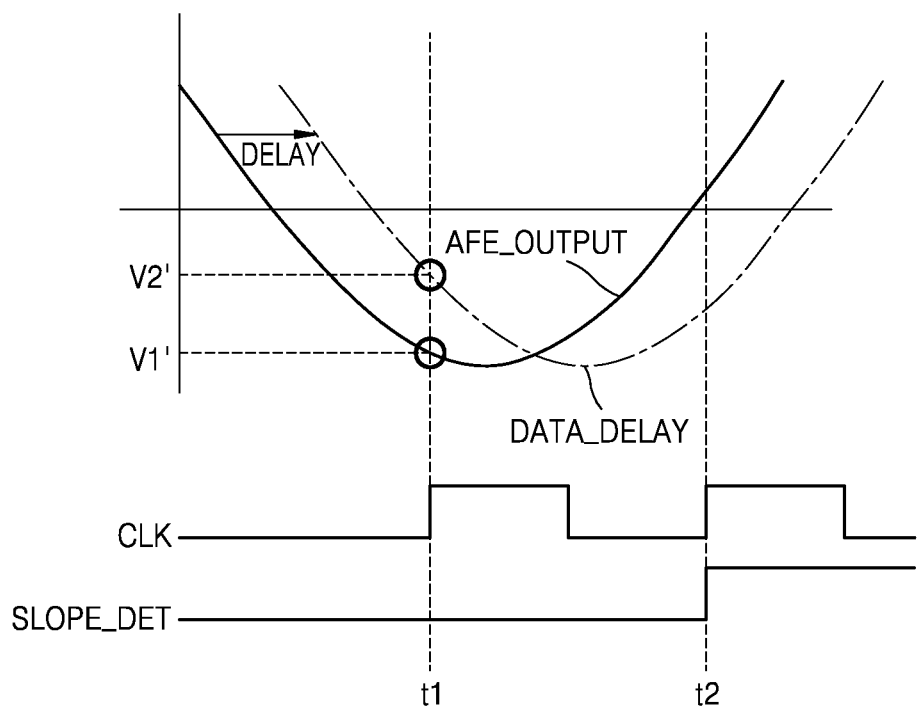

FIGS. 4A and 4B are diagrams for explaining the operation of the slope detector of FIG. 3.

FIG. 4A is a diagram exemplarily illustrating a logic level of a slope type determination signal SLOPE_DET when the open shape of the amplified input signal AFE_OUTPUT is convex.

Referring to FIG. 4A, at a first time point t1 when the clock signal CLK changes from a certain level to another level, that is, at the edge of the clock signal CLK, the level (or value) of the amplified input signal AFE_OUTPUT may be "V1", and the level of the delayed input signal DATA_DELAY may be "V2". In this case, "V1" may be greater than "V2". In this case, the logic level of the slope type determination signal SLOPE_DET may be a first logic level (e.g., a logic high level). This is because the delayed input signal DATA_DELAY is a delayed signal from the amplified input signal AFE_OUTPUT, so if the slope type is rising, "V1" becomes greater than "V2".

At the second time point t2 corresponding to the edge of the clock signal CLK, the level (or value) of the amplified input signal AFE_OUTPUT may be lower than the level of the delayed input signal DATA_DELAY. In this case, since the slope type is falling, the logic level of the slope type determination signal SLOPE_DET may be the second logic level (e.g., logic low level).

FIG. 4B is a diagram exemplarily illustrating the logic level of the slope type determination signal SLOPE_DET when the open shape of the amplified input signal AFE_OUTPUT is concave.

Referring to FIG. 4B, at a first time point t1 corresponding to the edge of the clock signal CLK, the level (or value) of the amplified input signal AFE_OUTPUT may be "V1", and the level of the delayed input signal DATA_DELAY may be "V2." Since "V1" is smaller than "V2", the logic level of the slope type determination signal SLOPE_DET may be the second logic level. At the second time point t2, since the level of the amplified input signal AFE_OUTPUT is higher than the level of the delayed input signal DATA_DELAY, the logic level of the slope type determination signal SLOPE_DET may be the first logic level.

Referring to FIGS. 4A and 4B, regardless of the shape of the amplified input signal AFE_OUTPUT, the slope type may be determined using the level of the amplified input signal AFE_OUTPUT and the level of the delayed input signal DATA_DELAY.

Figure 5:
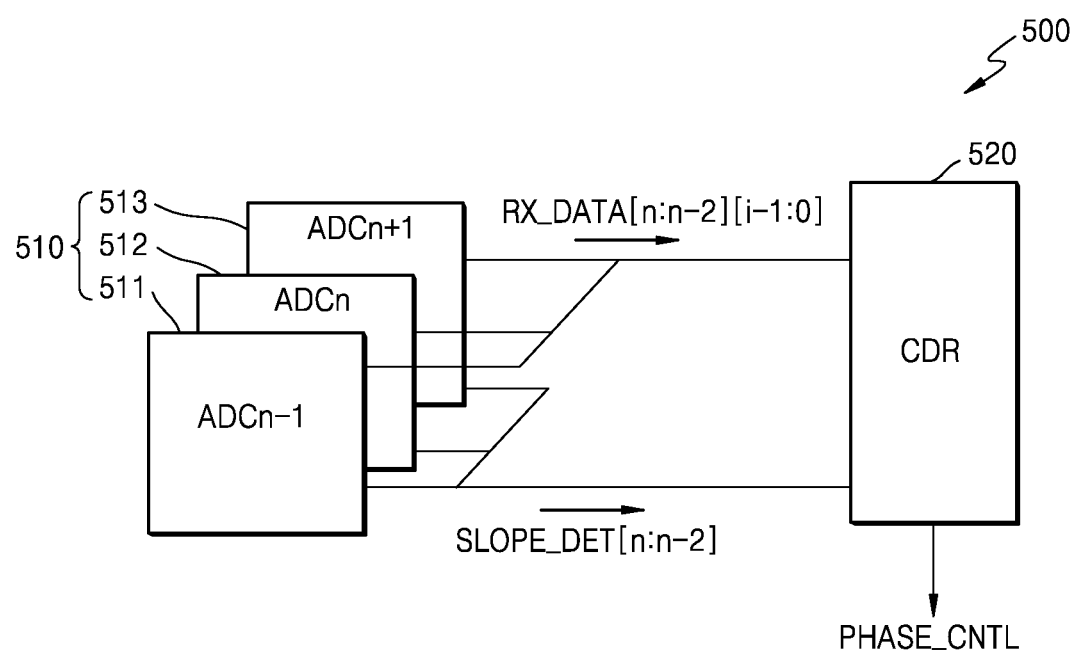
FIG. 5 is a block diagram illustrating serial analog-to-digital converters and a clock data restorer according to example embodiments.

FIG. 5 is a block diagram illustrating serial analog-to-digital converters and a clock data restorer according to exemplary embodiments.

Referring to FIG. 5, successive analog-to-digital converters 510 may be at least three analog-to-digital converters arranged in succession. For example, the serial analog-to-digital converters 510 may include (n−1)-th to (n+1)-th analog-to-digital converters 511, 512, and 513. However, the embodiments are not limited thereto. n may be an integer of 2 or more. The (n−1)-th to (n+1)-th analog-to-digital converters 511, 512, and 513 are arranged in succession or in sequence, and the (n−1)-th to (n+1)-th analog-to-digital converters 511, 512, and 513 may respectively output the (n−1)-th to (n+1)-th digital samples RX_DATA[n:n−2][i−1:0]. For example, the (n−1)-th analog-to-digital converter 511 outputs the (n−1)-th digital sample RX_DATA[n−2][i−1:0], the n-th analog-to-digital converter 512 outputs the n-th digital sample RX_DATA[n−1][i−1:0], and the (n+1)-th analog-to-digital converter 513 outputs the (n+1)-th digital sample RX_DATA[n][i−1:0].

The (n−1)-th to (n+1)-th analog-to-digital converters 511, 512, and 513 may output slope type determination signals SLOPE_DET[n:n−2]. Logic levels between the slope type determination signals SLOPE_DET[n:n−2] may be the same.

In some embodiments, clock data restorer 520 may determine the curve type using values of sequential (n−1)-th to (n+1)-th digital samples RX_DATA[n:n−2][i−1:0]. A certain embodiment of determining the curve type will be described later with reference to FIG. 6.

In other embodiments, when a difference between values of the (n−1)-th to (n+1)-th digital samples (RX_DATA[n:n−2][i−1:0]) is relatively small, there are cases where it is ambiguous to determine the type of curve as concave or convex. To clearly determine the curve type, the clock data restorer 520 may initiate an operation to determine the curve type when both the first and second conditions are satisfied. If any one of the first and second conditions is not satisfied, the clock data restorer 520 may not determine the curve type. In this case, the clock data restorer 520 may not output the phase compensation code signal PHASE_CNTL. The first and second conditions are described later with reference to FIG. 6.

Figure 6:
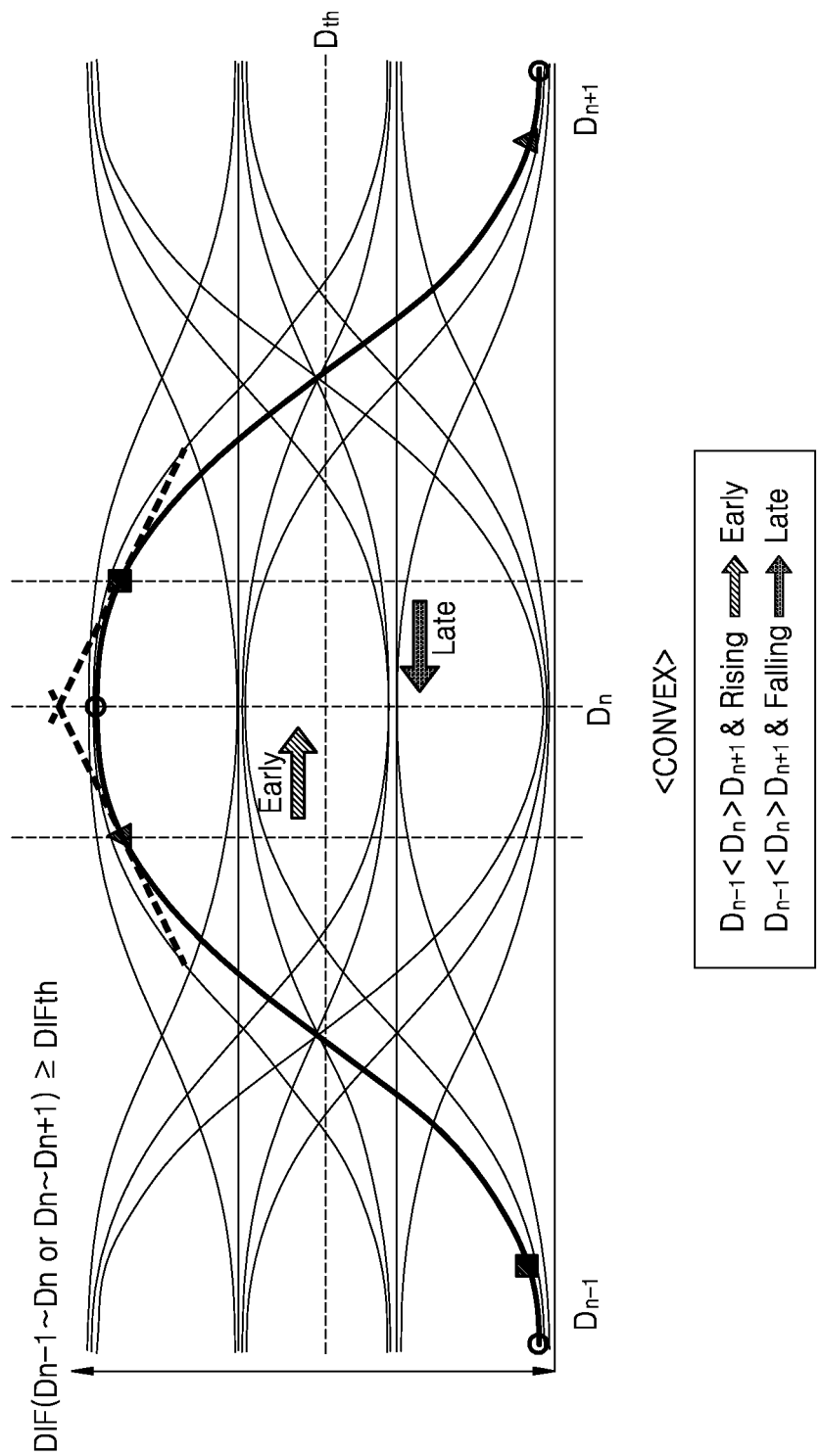
FIG. 6 is a diagram for explaining an embodiment of evaluating a curve type and a timing of a clock signal in the clock data restorer of FIG. 5.

FIG. 6 is a diagram for explaining an embodiment of evaluating a curve type and a timing of a clock signal in the clock data restorer of FIG. 5.

Referring to FIG. 6, when data is transitioned, an average of slopes of an analog signal at a phase where an eye diagram is widened the most may be close to zero regardless of an amount of channel attenuation.

Channel attenuation has no significant effect, so it may operate independently without an equalizer.

In some embodiments, among the values Dn−1, Dn, and Dn+1 of (n−1)-th to (n+1)-th digital samples, if the value Dn of the n-th digital sample is greater than the value Dn−1 of the (n−1)-th digital sample and the value Dn+1 of the (n+1)-th digital sample, the curve type may be determined as convex. If the curve type is convex and the slope type is rising, the timing of the clock signal may be evaluated as being earlier than the optimal timing. Conversely, if the curve type is convex and the slope type is falling, the timing of the clock signal may be evaluated as being later than the optimal timing.

Meanwhile, in other embodiments, the first condition described above with reference to FIG. 5 may be that the absolute value of the (n−1)-th digital sample and the absolute value of the (n+1)-th digital sample are equal to or greater than the reference value Dth. This may include a relational expression in which the value of the (n−1)-th digital sample Dn−1 and the value of the (n+1)-th digital sample $D_{n+1}$ are greater than the reference value Dth (to determine the shape of a concave curve), or the value of the (n−1)-th digital sample Dn−1 and the value of the (n+1)-th digital sample Dn+1 are smaller than the reference value Dth (to determine the shape of a convex curve). Referring to FIG. 6, for example, since the value Dn−1 of the (n−1)-th digital sample and the value Dn+1 of the (n+1)-th digital sample are less than the reference value Dth, it may be determined that the first condition is satisfied.

Meanwhile, in other embodiments, the second condition described above with reference to FIG. 5 may be that the first difference value DIF(Dn−1 to Dn) between the value of the (n−1)-th digital sample $D_{n-1}$ and the value of the n-th digital sample D_n is greater than or equal to the reference difference value DIFth, or the second difference value DIF(Dn to Dn+1) between the value of the (n+1)-th digital sample Dn+1 and the value of the n-th digital sample Dn is greater than or equal to the reference difference value DIFth. That is, the second condition may be that any one of the first difference values DIF(Dn−1 to Dn) and the second difference values DIF(Dn to Dn+1) is equal to or greater than the reference difference value DIFth.

An operation of determining whether the first and second conditions are satisfied according to other embodiments may be performed prior to an operation of determining a curve type.

Although not shown, unlike FIG. 6, when the value of the n-th digital sample Dn is smaller than the value of (n−1)-th digital sample Dn−1 and the value of (n+1)-th digital sample Dn+1, the curve type may be determined as concave. If the curve type is concave and the slope type is rising, the timing of the clock signal may be evaluated as being later than the optimal timing. Alternatively, if the curve type is concave and the slope type is falling, the timing of the clock signal may be evaluated as being earlier than the optimal timing.

Figure 7:
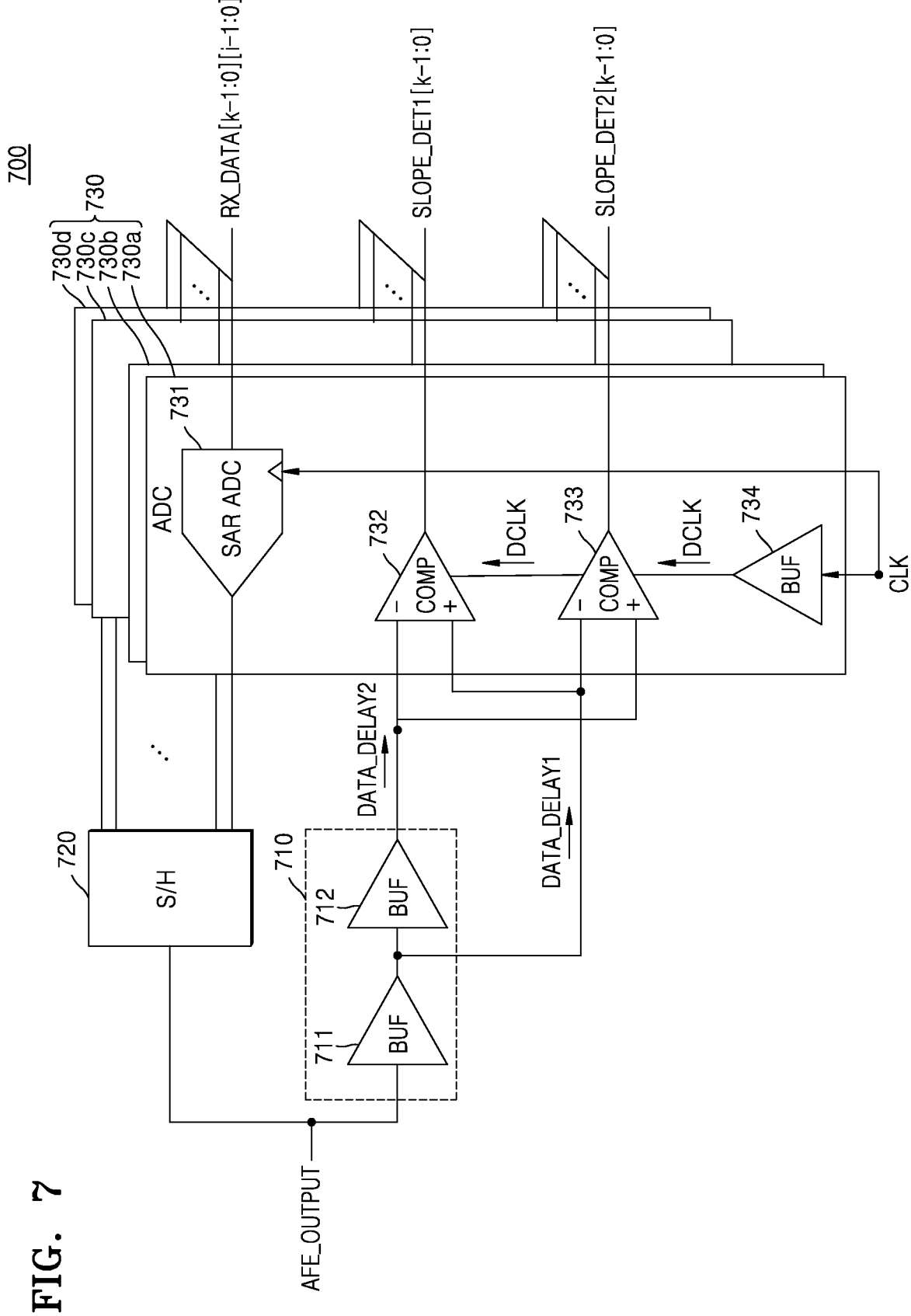
FIG. 7 is a block diagram illustrating a delay buffer and an analog-to-digital converter group according to example embodiments.

FIG. 7 is a block diagram illustrating a delay buffer and an analog-to-digital converter group according to exemplary embodiments.

Referring to FIG. 7, in a receiving device 700 shown in FIG. 7, since a sample and hold circuit 720 and a successive approximation register analog-to-digital converter 731 are same as the sample and hold circuit 220 and the successive approximation register analog-to-digital converter 231, a description thereof is omitted.

The delay buffer 710 may include first and second buffers 711 and 712.

The first buffer 711 may receive an analog signal (e.g., the amplified input signal AFE_OUTPUT) and output a first delayed analog signal DATA_DELAY1. The first delayed analog signal DATA_DELAY1 may be a delayed signal than the analog signal.

The second buffer 712 may receive the first delayed analog signal DATA_DELAY1 and output the second delayed analog signal DATA_DELAY2. The second delayed analog signal DATA_DELAY2 may be a delayed signal than the first delayed analog signal DATA_DELAY1.

Each of the plurality of analog-to-digital converters 730a, 730b, 730c, and 730d included in the analog-to-digital converter group 730 may include a successive approximation register analog-to-digital converter 731, a first slope detector 732, a second slope detector 733, and a clock delay buffer 734.

The first slope detector 732 may output a first slope type determination signal (e.g., SLOPE_DET1[0]) based on the delayed clock signal DCLK, the first delayed analog signal DATA_DELAY1, and the second delayed analog signal DATA_DELAY2. Specifically, the first slope detector 732 may compare the level of the first delayed analog signal DATA_DELAY1 and the level of the second delayed analog signal DATA_DELAY2 in response to the edge of the delayed clock signal DCLK, and output the comparison result as a first gradient type determination signal.

In some embodiments, the first slope detector 732 may be implemented as a comparator including a first polarity input terminal, a second polarity input terminal, an input terminal, and an output terminal. A first delay analog signal DATA_DELAY1 may be received through a first polarity terminal of the first slope detector 732. A second delayed analog signal DATA_DELAY2 may be received through the second polarity input terminal of the first slope detector 732. The delayed clock signal DCLK may be received through an input terminal of the first slope detector 732. A first slope type determination signal may be output to the output terminal of the first slope detector 732.

The second slope detector 733 may output a second slope type determination signal (e.g., SLOPE_DET2[0]) based on the delayed clock signal DCLK, the first delayed analog signal DATA_DELAY1, and the second delayed analog signal DATA_DELAY2. Specifically, the second slope detector 733 compares the level of the first delayed analog signal with the level of the second delayed analog signal in response to the edge of the delayed clock signal and outputs a comparison result as a second slope type determination signal.

In some embodiments, the second slope detector 733 may be implemented as a comparator including a first polarity input terminal, a second polarity input terminal, an input terminal, and an output terminal. The second delay analog signal DATA_DELAY2 may be received through the first polarity terminal of the second slope detector 733. The first delayed analog signal DATA_DELAY1 may be received through the second polarity input terminal of the second slope detector 733. The delayed clock signal DCLK may be received through an input terminal of the second slope detector 733. A second slope type determination signal may be output to the output terminal of the second slope detector 733.

For the first and second slope detectors 732 and 733 implemented with the comparator of FIG. 7, the first slope type determination signal and the second slope type determination signal may have opposite phases to each other. That is, the logic level of the first gradient type determination signal may be opposite to that of the second gradient type determination signal.

The clock delay buffer 734 may output the delayed clock signal DCLK delayed with respect to the clock signal CLK.

As described above, there is an advantage in determining the slope type more accurately and stably.

Figure 8A:
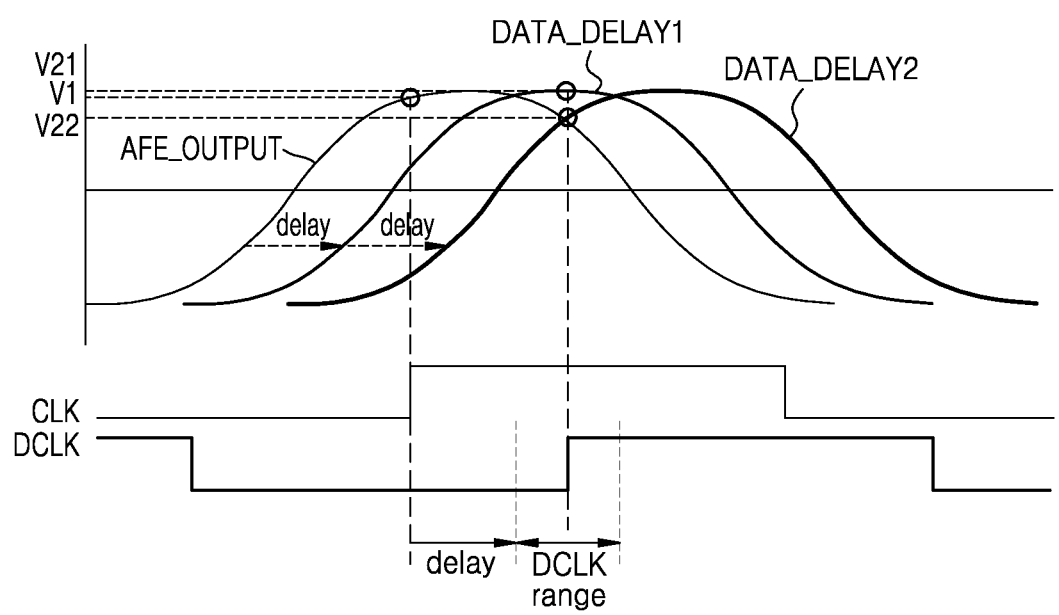
FIGS. 8A and 8B are diagrams for explaining operations of the slope detectors of FIG. 7.
Figure 8B:
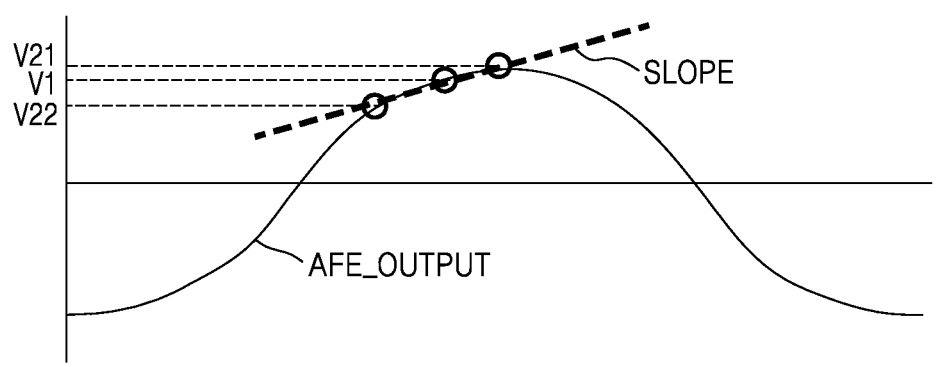

FIGS. 8A and 8B are diagrams for explaining operations of the slope detectors of FIG. 7.

Referring to FIG. 8A, the first delayed analog signal DATA_DELAY1 may be a delayed signal than the amplified input signal AFE_OUTPUT, and the second delayed analog signal DATA_DELAY2 may be a delayed signal than the first delayed analog signal DATA_DELAY1.

To determine the type of slope of the input signal AFE_OUTPUT amplified using the first delayed analog signal DATA_DELAY1 and the second delayed analog signal DATA_DELAY2, the edge of the clock signal CLK to be used for sampling the two signals also needs to be delayed. Edge timing of the delayed clock signal DCLK may be adjusted according to embodiments.

At the edge of the delayed clock signal DCLK, each of the first delayed analog signal DATA_DELAY1 and the second delayed analog signal DATA_DELAY2 may be sampled. At this time, the level (or value) of the first delayed analog signal DATA_DELAY1 may be "V21" and the level (or value) of the second delayed analog signal DATA_DELAY2 may be "V22". "V21" and "V22" may have different values from "V1".

Referring to FIG. 8B, by using a sign function (or sgn) for a level difference between the first and second delayed analog signals DATA_DELAY1 and DATA_DELAY2, the slope type SLOPE may be determined by the first and second slope detectors 732 and 733, respectively.

For example, the logic level (or bit value) of the first slope type determination signal (SLOPE_DET1) output by the first slope detector 732 may be calculated through $$\text{SLOPE } DET1 = \text{sgn}(\text{DATA\_DELAY1} - \text{DATA\_DELAY2}) \quad \text{[Equation 1]}$$

As shown in FIG. 8B, if "V21" is greater than "V22", the logic level of the first slope type determination signal SLOPE_DET1 may be the first logic level (e.g., logic high level), or a bit value of the first slope type determination signal SLOPE_DET1 may be "1".

Meanwhile, the logic level of the second slope type determination signal SLOPE_DET2 output by the second slope detector 733 may be calculated through [Equation 2] below.

$$\text{SLOPE } DET2 = \text{sgn}(\text{DATA\_DELAY2} - \text{DATA\_DELAY1}) \quad \text{[Equation 2]}$$

As shown in FIG. 8B, if "V21" is greater than "V22", the logic level of the second slope type determination signal SLOPE_DET2 may be the second logic level (e.g., logic low level), or a bit value of the first-second slope type determination signal SLOPE_DET2 may be "0".

Although not shown, if "V21" is smaller than "V22", results of the first and second slope type determination signals SLOPE_DET1 and SLOPE_DET2 may be opposite to those described above.

As described above, compared to the MMPD, there is an advantage in that all phases may be consistently locked.

Figure 9:
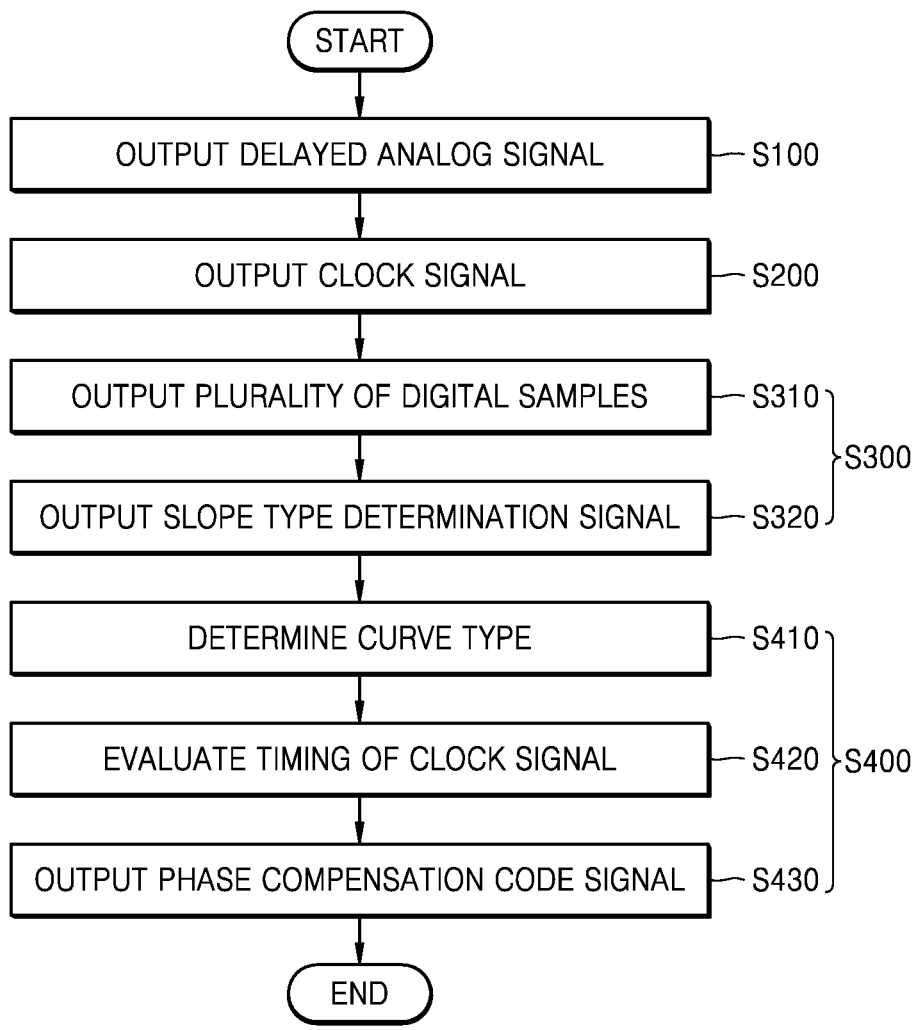
FIG. 9 is a flowchart for explaining a method of operating the receiving device of FIG. 1.

FIG. 9 is a flowchart for explaining a method of operating the receiving device of FIG. 1.

Referring to FIGS. 1 and 9, the operating method of the receiving device 100 may include operations S100 to S400.

Operation S100 may be performed by the delay buffer 120. In operation S100, the delay buffer 120 delays the analog signal received from the outside, and outputs a delayed analog signal that is delayed with respect to the analog signal.

Operation S200 may be performed by the phase interpolator 170. In operation S200, the phase interpolator 170 may output a clock signal CLK based on the phase compensation code signal PHASE_CNTL and the reference clock signal CLK_REF.

Operation S300 may be performed by the analog-to-digital converter group 140. Operation S300 may include operation S310 and operation S320.

In operation S310, the analog-to-digital converter group 140 may output the analog signal and the clock signal CLK as a plurality of digital samples RX_DATA.

In operation S320, the analog-to-digital converter group 140 may output a slope type determination signal based on the clock signal CLK, the analog signal, and the analog delay signal. The slope type determination signal may be a signal indicating a rising or falling slope of the analog signal.

Operation S400 may be performed by the clock data restorer 150. Operation S400 may include operation S410, operation S420, and operation S430.

In operation S410, the clock data restorer 150 may determine a curve type based on the plurality of digital samples RX_DATA. The curve type may be a form indicating convexity or concaveness of a curve made of at least some digital samples among the plurality of digital samples RX_DATA.

In some embodiments of operation S310 and operation S410, the analog-to-digital converter group 140 includes first to third analog-to-digital converters sequentially arranged, and the first to third analog-to-digital converters may output first to third digital samples. Also, among sequential first to third digital samples, a value of a second digital sample may be greater than a value of the first digital sample and a value of the third digital sample. The clock data restorer 150 may determine the curve type as convex with respect to the first to third digital samples.

In other embodiments of operation S310 and operation S410, the analog-to-digital converter group 140 includes first to third analog-to-digital converters sequentially arranged, and the first to third analog-to-digital converters may output first to third digital samples. Also, among sequential first to third digital samples, a value of a second digital sample may be less than a value of the first digital sample and a value of the third digital sample. The clock data restorer 150 may determine the curve type as concave with respect to the first to third digital samples.

In operation S420, the clock data restorer 150 may evaluate the timing of the clock signal CLK based on the logic levels of the curve type and slope type determination signals.

In some embodiments for operation S420, when the curve type is convex and the slope type is ascending, or the curve type is concave and the slope type is descending, the clock data restorer 150 may evaluate that the timing of the clock signal CLK is earlier than the optimal timing.

Also at operation S420, when the curve type is convex and the slope type is falling, or the curve type is concave and the slope type is rising, the clock data restorer 150 may evaluate that the timing of the clock signal CLK is later than the optimal timing.

In operation S430, the clock data restorer 150 may output a phase compensation code signal PHASE_CNTL according to the evaluation result.

In some embodiments for operation S430, if the timing of the clock signal CLK is evaluated to be ahead of the optimal timing, the clock data restorer 150 may decrease the value (e.g., code value) of the phase compensation code signal PHASE_CNTL.

Also at operation S430, if the timing of the clock signal CLK is evaluated to be behind the optimal timing, the clock data restorer 150 may increase a value (e.g., code value) of the phase compensation code signal PHASE_CNTL.

Figure 10:
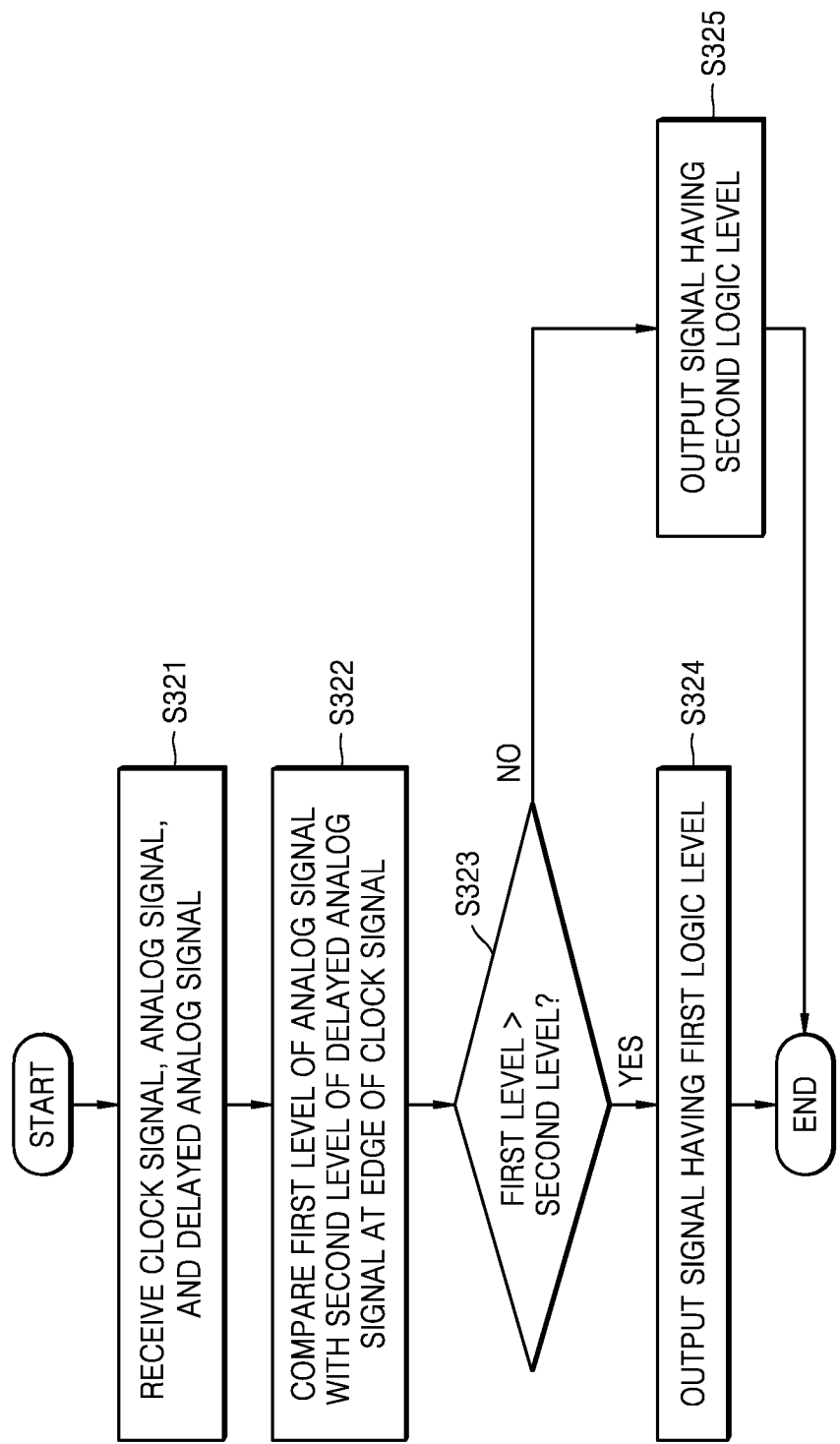
FIG. 10 is a flowchart for explaining a certain embodiment of operation S320 of FIG. 9.

FIG. 10 is a flowchart for explaining a certain embodiment of operation S320 of FIG. 9.

Referring to FIGS. 2 and 10, operation S320 of FIG. 9 may include operations S321 to operation S325.

In operation S321, the analog-to-digital converter group 230 may receive a clock signal CLK, an analog signal, and a delayed analog signal.

In operation S322, the slope detector 232 of the analog-to-digital converter group 140 may compare the first level of the analog signal and the second level of the delayed analog signal at the edge of the clock signal CLK.

In operation S323, it may be determined whether the first level is greater than the second level.

Operation S324 and operation S325 may be operations of outputting a signal having a first logic level or a second logic level as a slope type determination signal.

If the first level is greater than the second level (S323, YES), in operation S324, the slope detector 232 may output a signal having a first logic level. In this case, the first logic level may indicate that the type of slope of the analog signal is rising.

If the first level is not greater than the second level (S323, NO), in operation S325, the slope detector 232 may output a signal having a second logic level different from the first logic level. In this case, the second logic level may indicate that the type of slope of the analog signal is falling.

Figure 11:
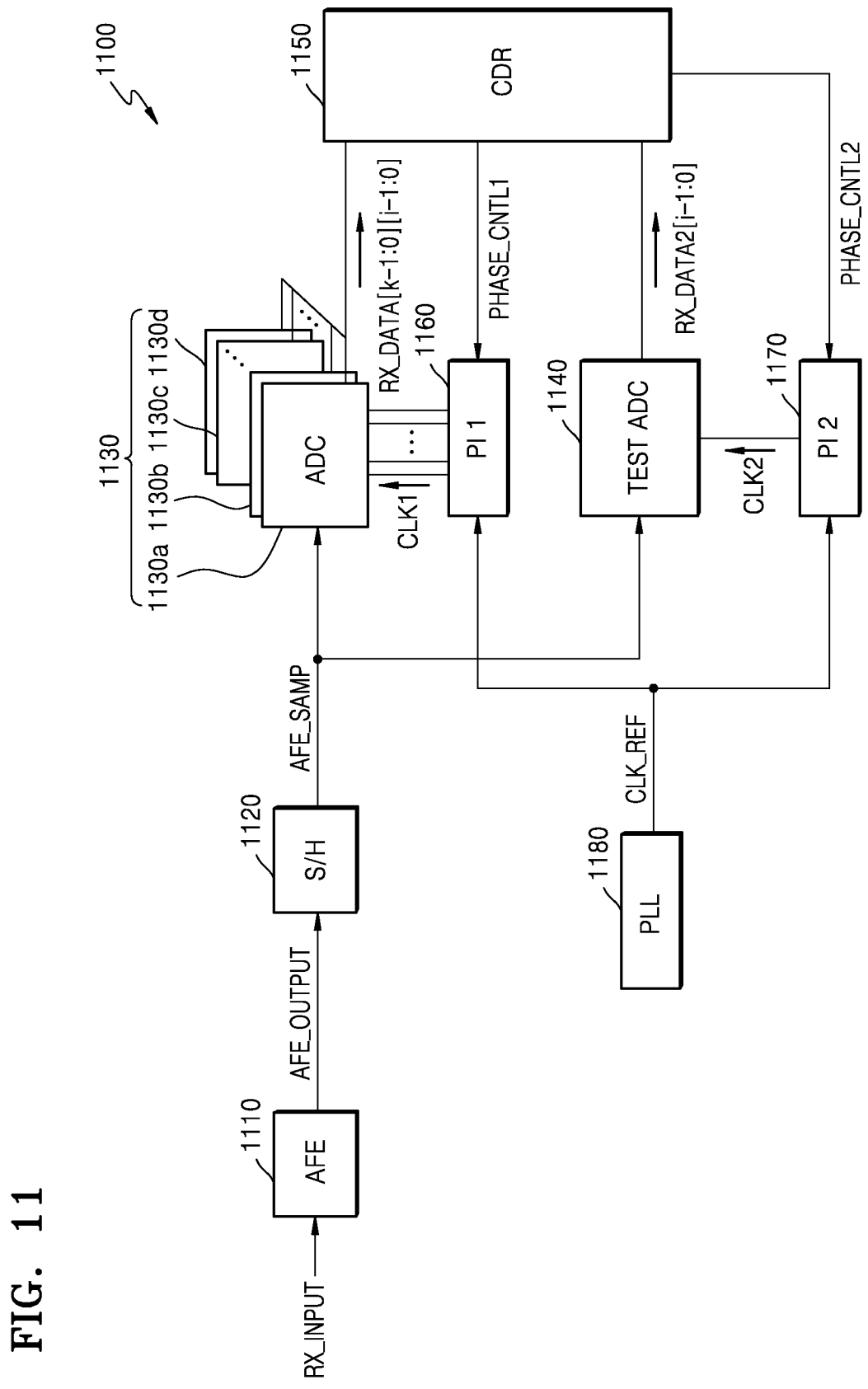
FIG. 11 is a block diagram illustrating a receiving device according to other embodiments.

FIG. 11 is a block diagram illustrating a receiving device according to other embodiments.

Referring to FIG. 11, a receiving device 1100 includes an analog front end 1110, a sampling and holding circuit 1120, an analog-to-digital converter group 1130, a test analog-to-digital converter 1140, a clock data restorer. 1150, a first phase interpolator 1160, a second phase interpolator 1170, and a phase synchronization circuit 1180.

The analog front end 1110, the sample and hold circuit 1120, and the phase lock circuit 1180 may be the same as the analog front end 110, the sampling and holding circuit 130, and the phase synchronization circuit 160 described above with reference to FIG. 1.

The analog-to-digital converter group 1130 may output a plurality of digital samples (e.g., k digital samples RX_DATA[k−1:0][i−1:0]) based on the analog signal and the first clock signal CLK1. For example, the analog-to-digital converter group 1130 may output k digital samples RX_DATA[k−1:0][i−1:0] by sampling the sampled signal AFE_SAMP in response to the first clock signal CLK1 (e.g., in response to an edge of the first clock signal CLK1).

The analog-to-digital converter group 1130 may include k analog-to-digital converters 1130a, 1130b, 1130c, and 1130d. Any one of the k digital samples RX_DATA[k−1:0][i−1:0] output from the k analog-to-digital converters 1130a, 1130b, 1130c, and 1130d may be referred to as a first digital sample.

The test analog-to-digital converter 1140 may be an analog-to-digital converter that may be used to test performance evaluation of the receiving device 1100. The test analog-to-digital converter 1140 may be designed separately from the analog-to-digital converter group 1130. The test analog-to-digital converter 1140 may output the second digital sample RX_DATA2[i−1:0] by sampling an analog signal (e.g., the sampled signal AFE_SAMP) in response to the second clock signal CLK2.

The clock data restorer 1150 may determine the slope type based on a first digital sample and a second digital sample RX_DATA2[i−1:0] selected from among a plurality of digital samples (e.g., k digital samples RX_DATA[k−1:0][i−1:0]). The slope type may indicate whether the slope of the analog signal is rising or falling.

In some embodiments, the first digital sample may be output from an analog-to-digital converter adjacent to the test analog-to-digital converter 1140 among the k analog-to-digital converters 1130a, 1130b, 1130c, and 1130d. For example, if the test analog-to-digital converter 1140 is adjacent to the k-th analog-to-digital converter of the analog-to-digital converter group 1130, the first digital sample may be a digital sample output from the k-th analog-to-digital converter. For another example, when the test analog-to-digital converter 1140 is adjacent to the first analog-to-digital converter of the analog-to-digital converter group 1130, the first digital sample may be a digital sample output from the first analog-to-digital converter.

In some embodiments, the clock data restorer 1150 may calculate the difference between the digital samples by subtracting the value of the first digital sample from the value of the second digital sample. And, the clock data restorer 1150 may determine the slope type according to the sign of the above-mentioned difference.

The clock data restorer 1150 may determine a curve type based on a plurality of digital samples (e.g., k digital samples RX_DATA[k−1:0][i−1:0]). The curve type may refer to a form indicating a convex or concave curve of at least some digital samples among a plurality of digital samples (e.g., k digital samples RX_DATA[k−1:0][i−1:0]). An embodiment of determining the curve type is as described above with reference to FIG. 6.

In some embodiments, the clock data restorer 1150 may determine the curve type based on digital samples of three consecutively placed analog-to-digital converters. Referring to FIGS. 6 and 11, for example, if the value D_n of the n-th digital sample is greater than the value Dn−1 of the (n−1)-th digital sample and the value Dn+1 of the (n+1)-th digital sample, the clock data restorer 1150 may determine the curve type as convex. Referring to FIGS. 6 and 11, for another example, if the value D_n of the n-th digital sample is less than the value Dn−1 of the (n−1)-th digital sample and the value Dn+1 of the (n+1)-th digital sample, the clock data restorer 1150 may determine the curve type as concave.

In other embodiments, the clock data restorer 1150 may determine the curve type when both the first and second conditions described above with reference to FIG. 6 are satisfied.

The clock data restorer 1150 may evaluate the timing of the first clock signal CLK1 based on the slope type and the curve type.

For example, when the curve type is convex and the slope type is rising, or when the curve type is concave and the slope type is falling, the timing of the first clock signal CLK1 is evaluated as being earlier than the optimal timing.

For another example, if the curve type is convex and the type of slope is descending, or if the curve type is concave and the type of slope is ascending, the timing of the first clock signal CLK1 may be evaluated as being later than the optimal timing.

The clock data restorer 1150 may output first and second phase compensation code signals PHASE_CNTL1 and PHASE_CNTL2 according to evaluation results.

For example, when it is evaluated that the timing of the first clock signal CLK1 is ahead of the optimal timing, the clock data restorer 1150 may decrease the value of the first phase compensation code signal PHASE_CNTL1. Also, the clock data restorer 1150 may calculate the value of the second phase compensation code signal PHASE_CNTL2 by adding the reduced value of the first phase compensation code signal PHASE_CNTL1 and the offset value.

For another example, when it is evaluated that the timing of the first clock signal CLK1 lags behind the optimal timing, the clock data restorer 1150 may increase the value of the first phase compensation code signal PHASE_CNTL1. Also, the clock data restorer 1150 may calculate the value of the second phase compensation code signal PHASE_CNTL2 by adding the increased value of the first phase compensation code signal PHASE_CNTL1 and the offset value.

A code value of each phase compensation code signal may have a range between 0 and 128 (1UI).

The first phase interpolator 1160 may output the first clock signal CLK1 based on the first phase compensation code signal PHASE_CNTL1 (which may be referred to as a first feedback signal) and the reference clock signal CLK_REF.

The second phase interpolator 1170 may output the second clock signal CLK2 delayed more than the first clock signal CLK1 based on the second phase compensation code signal PHASE_CNTL2 (which may be referred to as a second feedback signal) and the reference clock signal CLK_REF. The phase of the second clock signal CLK2 may be the sum of the phase of the first clock signal CLK1 and a, but is not limited thereto.

Although not shown, the receiving device 1100 may further include an equalizer. The equalizer and clock data restorer 150 may be implemented as a DSP within the receiving device 100.

As described above, by evaluating the timing of the clock using the output values of the analog-to-digital converter without using the output of the equalizer, this has the effect of reducing loop latency.

In addition, as described above, by evaluating the clock timing without using the output of the equalizer, there is an effect of preventing excessive occurrence of jitter or reducing a requirement for jitter tolerance (JTOL).

Furthermore, as described above, the phase of the clock is stably detected by evaluating the timing of the clock using the slope of the analog signal and the curve type of the digital samples.

Figure 12:
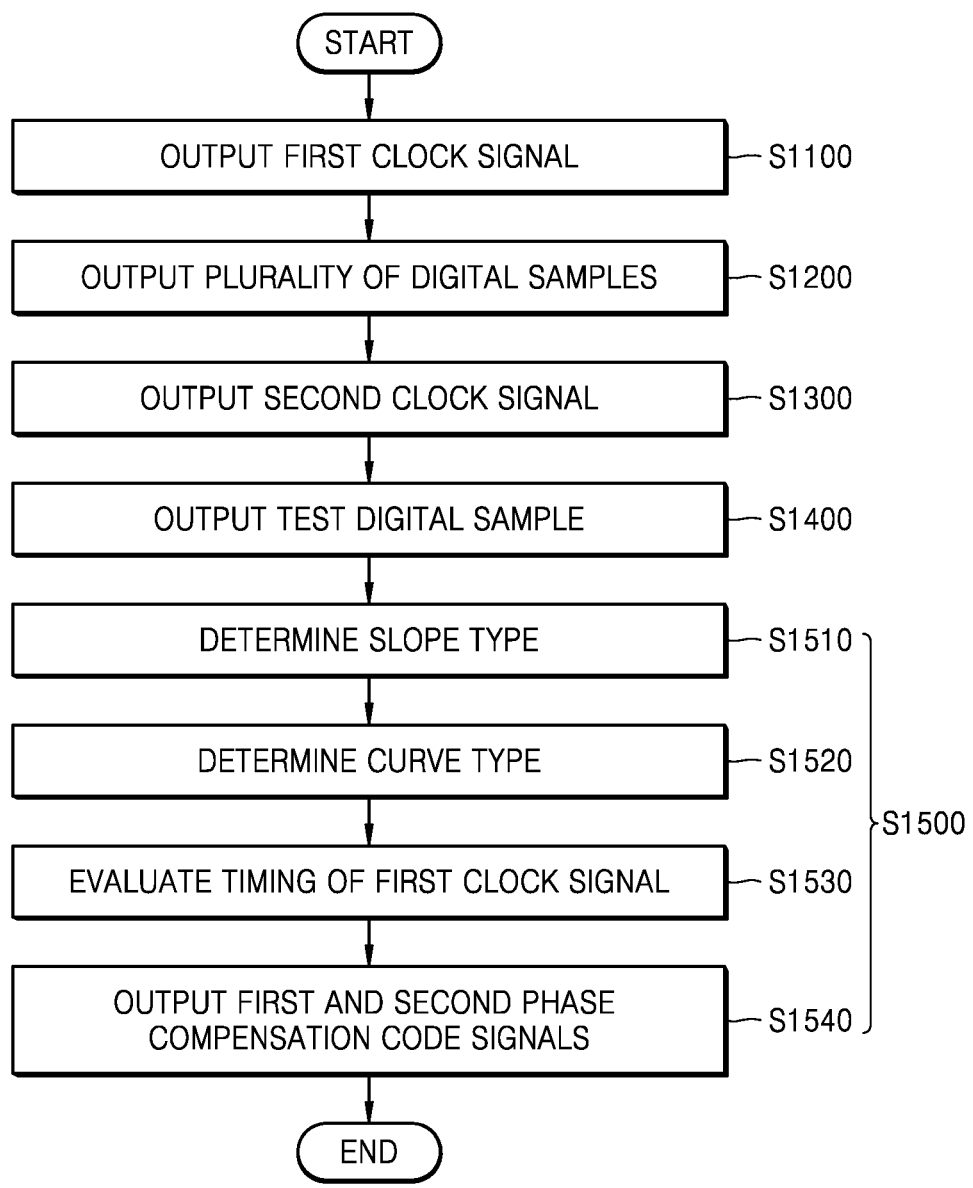
FIG. 12 is a flowchart for explaining a method of operating the receiving device of FIG. 11.

FIG. 12 is a flowchart for explaining a method of operating the receiving device of FIG. 11.

Referring to FIGS. 11 and 12, the operating method of the receiving device 1100 may include operation S1100 to operation S1500.

Operation S1100 may be performed by the first phase interpolator 1160. In operation S1100, the first phase interpolator 1160 may output the first clock signal CLK1 based on the first phase compensation code signal PHASE_CNTL1 and the reference clock signal CLK_REF.

Operation S1200 may be performed by the analog-to-digital converter group 1130. In operation S1200, the analog-to-digital converter group 1130 may sample an analog signal received from the outside in response to the first clock signal CLK1, and output a plurality of digital samples (e.g., k digital samples RX_DATA[k−1:0][i−1:0]).

Operation S1300 may be performed by the second phase interpolator 1170. In operation S1300, the second phase interpolator 1170 may output the second clock signal CLK2 based on the second phase compensation code signal PHASE_CNTL2 and the reference clock signal CLK_REF.

Operation S1400 may be performed by the test analog-to-digital converter 1140. In operation S1400, the test analog-to-digital converter 1140 samples an analog signal in response to the second clock signal CLK2, and outputs a second digital sample RX_DATA2[i−1:0].

Operation S1500 may be performed by the clock data restorer 1150. Operation S1500 may include operation S1510, operation S1520, and operation S1530.

In operation S1510, the clock data restorer 1150 may determine a slope type based on the first digital sample and the second digital sample RX_DATA2[i−1:0].

In operation S1520, the clock data restorer 1150 may determine a curve type based on a plurality of digital samples (e.g., k digital samples RX_DATA[k−1:0][i−1:0]).

In some embodiments of operation S1200 and operation S1520, successive (n−1)-th to (n+1)-th digital samples may be output in operation S1200. The value of the n-th digital sample may be greater than the value of the (n−1)-th digital sample and the value of the (n+1)-th digital sample. In operation S1520, a curve type may be determined to be convex from the successive (n−1)-th to (n+1)-th digital samples.

In other embodiments of operation S1200 and operation S1520, successive (n−1)-th to (n+1)-th digital samples may be output in operation S1200. The value of the n-th digital sample may be less than the value of the (n−1)-th digital sample and the value of the (n+1)-th digital sample. In operation S1520, a curve type may be determined to be concave from the successive (n−1)-th to (n+1)-th digital samples.

In some embodiments of operation S1520, operation S1520 may be performed only when the aforementioned first and second conditions are satisfied.

In operation S1530, the clock data restorer 1150 may evaluate the timing of the first clock signal CLK1 based on the slope type and the curve type.

In some embodiments for operation S1530, if the curve type is convex and the type of slope is ascending, or if the curve type is concave and the type of slope is descending, the clock data restorer 1150 may evaluate that the timing of the first clock signal CLK1 is ahead of the optimal timing.

In other embodiments for operation S1530, if the curve type is convex and the slope type is descending, or if the curve type is concave and the slope type is ascending, the clock data restorer 1150 may evaluate that the timing of the first clock signal CLK1 lags behind the optimal timing.

In operation S1540, the clock data restorer 1150 may output first and second phase compensation code signals PHASE_CNTL1 and PHASE_CNTL2 according to the evaluation result.

Figure 13:
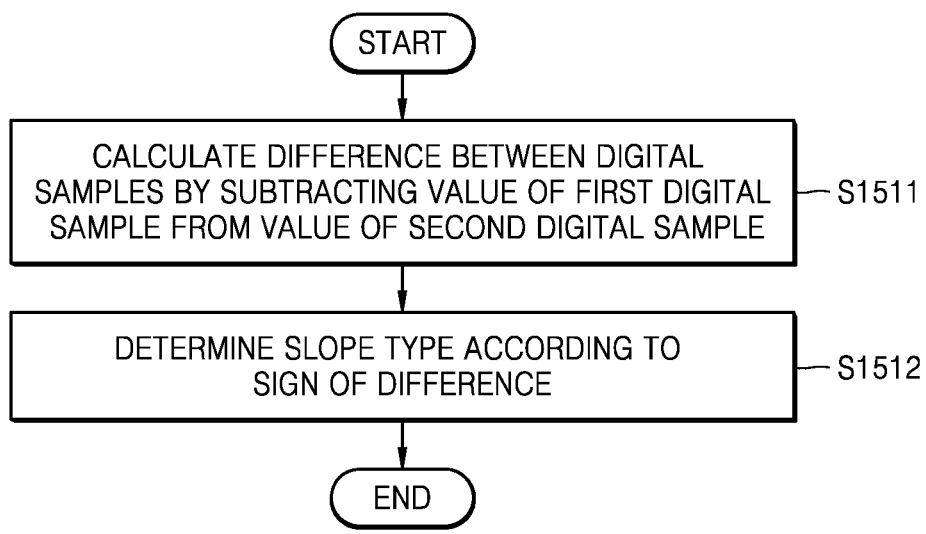
FIG. 13 is a flowchart for explaining a certain embodiment of operation S1510 of FIG. 12.

FIG. 13 is a flowchart for explaining a certain embodiment of operation S1510 of FIG. 12.

Referring to FIGS. 2 and 13, operation S1510 of FIG. 12 may include operation S1511 and operation S1512. For example, if the sign of the difference is positive, the slope type may be falling, and if the sign of the difference is negative, the slope type may be rising. However, the embodiments are not limited thereto.

Figure 14:
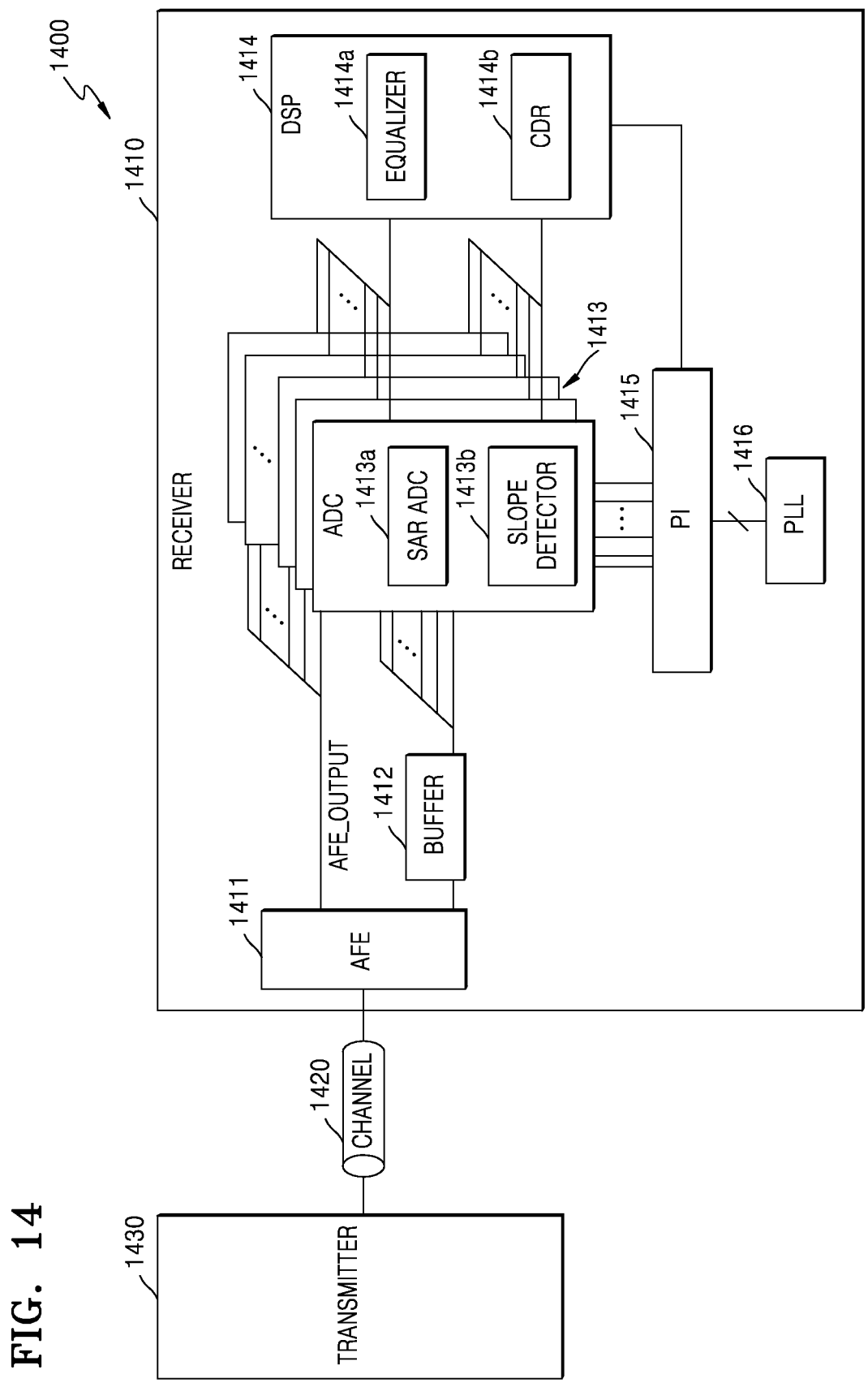
FIG. 14 is a diagram for explaining an electronic system according to an embodiment.

FIG. 14 is a diagram for explaining an electronic system according to an embodiment.

Referring to FIG. 14, an electronic system 1400 may include a receiver 1410, a channel 1420, and a transmitter 1430.

The receiver 1410 may correspond to the receiving device 100 of FIG. 1. The receiver 1410 may correspond to the receiving device 1100 of FIG. 11. Hereinafter, it is assumed that the receiver 1410 corresponds to the receiving device 100 of FIG. 1.

The receiver 1410 may receive an analog signal from the transmitter 1430 through a channel 1420. The receiver 1410 may include an analog front end 1411, a buffer 1412, a plurality of analog-to-digital converters 1413, a digital signal processor 1414, a phase interpolator 1415, and a phase locked loop 1416.

The buffer 1412 may correspond to the delay buffer 120 of FIG. 1.

Each of the plurality of analog-to-digital converters 1413 may include a successive approximation register analog-to-digital converter 1413a and a slope detector 1413b.

The digital signal processor 1414 may include an equalizer 1414a and a clock data restorer 1414b.

The equalizer 1414a may process a plurality of digital samples provided from the plurality of analog-to-digital converters 1413 and output processed digital signals.

The clock data restorer 1414b may evaluate the timing of the clock signal based on the plurality of digital samples provided from the plurality of analog-to-digital converters 1413 and the slope type detection signals, and output a phase compensation code signal according to the evaluation result.

Since the clock data restorer 1414b uses the plurality of digital samples provided from the plurality of analog-to-digital converters 1413 and the slope type detection signals to output a phase compensation code signal, loop latency may be reduced compared to when the clock data restorer 1414b outputs the phase compensation code signal using the output of the equalizer 1414a.

Figure 15:
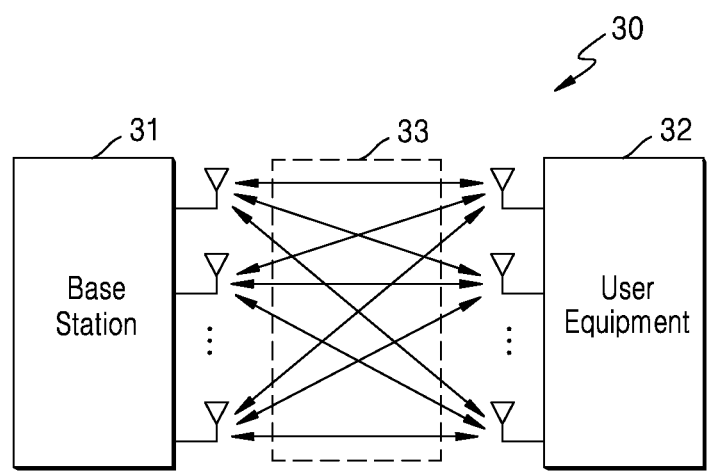
FIG. 15 is a block diagram illustrating a wireless communication system according to an embodiment.

FIG. 15 is a block diagram illustrating a wireless communication system according to an embodiment.

Specifically, FIG. 15 shows an example of wireless communication between a base station 31 and a user equipment 32 in a wireless communication system 30 using a cellular network. The wireless communication system 30 may define a high carrier frequency, and the base station 31 and the user equipment 32 may include receiving devices according to exemplary embodiments described above.

A base station 31 may be a fixed station that communicates with the user equipment 32 and/or other base stations. For example, the base station 31 may be referred to as a Node B, an evolved-Node B (eNB), a sector, a site, a base transceiver system (BTS), an access point (AP), a relay node, a remote radio head (RRH), a radio unit (RU), a small cell, and the like. The user equipment 32 may be fixed or mobile, and may transmit and receive data and/or control information by communicating with a base station. For example, the user equipment 32 may be referred to as a terminal equipment, a mobile station (MS), a mobile terminal (MT), a user terminal (UT), a subscriber station (SS), a wireless device, a handheld device, and the like. As shown in FIG. 15, the base station 31 and the user equipment 32 may each include a plurality of antennas, and may perform wireless communication through a Multiple Input Multiple Output (MIMO) channel 33.

While certain embodiments have been particularly shown and described with reference to embodiments thereof, it will be understood that various changes in form and details may be made therein without departing from the scope of the following claims.

What is claimed is:

1. A receiving device comprising:
   a delay buffer configured to receive an analog signal and output a delayed analog signal that is delayed with respect to the analog signal;
   a phase interpolator configured to output, based on a phase compensation code signal and a reference clock signal, a clock signal;
   an analog-to-digital converter group configured to:
      output, based on the analog signal and the clock signal, a plurality of digital samples comprising a first digital sample with a first value, a second digital sample with a second value and a third digital sample with a third value, and
      output, based on the analog signal and the delayed analog signal, a slope type determination signal indicating a rising slope or a falling slope of the analog signal; and
   a clock data restorer configured to:
      determine, based on the plurality of digital samples, a curve type indicating a convex curve or a concave curve of a curve comprising the plurality of digital samples,
      obtain, based on the curve type and the slope type determination signal, an evaluation result with respect to a timing of the clock signal, and
      output, based on the evaluation result, the phase compensation code signal,
   wherein, in an eye diagram of the analog signal, the curve type indicates the convex curve based on an open shape of the analog signal being convex and indicates the concave curve based on the open shape of the analog signal being concave, and
   wherein the clock signal is configured to sample the open shape of the eye diagram.

2. The receiving device of claim 1, wherein the analog-to-digital converter group comprises a plurality of analog-to-digital converters,
   wherein each of the plurality of analog-to-digital converters comprises:
      a successive approximation register analog-to-digital converter configured to output a digital sample by sampling the analog signal in response to an edge of the clock signal; and
      a slope detector configured to output a result of comparing the analog signal with the delayed analog signal as the slope type determination signal in response to the edge of the clock signal.

3. The receiving device of claim 2, wherein the slope detector comprises a comparator configured to:
   receive the analog signal and the delayed analog signal through input terminals,
   compare the analog signal with the delayed analog signal at the edge of the clock signal, and
   output a signal having a first logic level or a second logic level as the slope type determination signal.

4. The receiving device of claim 1, wherein the analog-to-digital converter group comprises:
   a first analog-to-digital converter, a second analog-to-digital converter, and a third analog-to-digital converter that are sequentially arranged, the first analog-to-digital converter being configured to output the first digital sample, the second analog-to-digital converter being configured to output the second digital sample, and the third analog-to-digital converter being configured to output the third digital sample,
   wherein the clock data restorer is further configured to:
      determine the curve type as the convex curve based on the second value of the second digital sample being greater than the first value of the first digital sample and the third value of the third digital sample, and
      determine the curve type as the concave curve based on the second value of the second digital sample being less than the first value of the first digital sample and the third value of the third digital sample.

5. The receiving device of claim 1, wherein the clock data restorer is further configured to:
   determine that the timing of the clock signal is earlier than an optimum timing based on the curve type being the convex curve and a slope type being the rising slope, and
   determine that the timing of the clock signal is later than the optimum timing based on the curve type being the convex curve and the slope type being the falling slope.

6. The receiving device of claim 1, wherein the clock data restorer is further configured to:
   determine that the timing of the clock signal is later than an optimal timing based on the curve type being the concave curve and a slope type being the rising slope, and
   determine that the timing of the clock signal is earlier than the optimal timing based on the curve type being the concave curve and the slope type being the falling slope.

7. The receiving device of claim 1, wherein the analog-to-digital converter group comprises a first analog-to-digital converter, a second analog-to-digital converter, and a third analog-to-digital converter that are sequentially arranged, the first analog-to-digital converter being configured to output the first digital sample, the second analog-to-digital converter being configured to output the second digital sample, and the third analog-to-digital converter being configured to output the third digital sample,
   wherein the clock data restorer is configured to determine the curve type based on: i) a first absolute value of the first digital sample and a second absolute value of the third digital sample being greater than or equal to a reference value, and ii) a first difference value between the first value of the first digital sample and the second value of the second digital sample or a second difference value between the third value of the third digital sample and the second value of the second digital sample being greater than or equal to a reference difference value.

8. The receiving device of claim 1, wherein the delay buffer comprises:
a first buffer configured to:
receive the analog signal, and
output a first delayed analog signal delayed with respect to the analog signal; and
a second buffer configured to:
receive the first delayed analog signal, and
output a second delayed analog signal delayed with respect to the first delayed analog signal,
wherein the analog-to-digital converter group comprises a plurality of analog-to-digital converters,
wherein each of the plurality of analog-to-digital converters comprises:
a successive approximation register analog-to-digital converter configured to output a digital sample by sampling the analog signal in response to a first edge of the clock signal;
a clock delay buffer configured to output a delayed clock signal that is delayed with respect to the clock signal;
a first slope detector configured to output a first result of comparing the first delayed analog signal with the second delayed analog signal as a first slope type determination signal; and
a second slope detector configured to output a second result of comparing the first delayed analog signal with the second delayed analog signal as a second slope type determination signal,
wherein the first slope type determination signal and the second slope type determination signal have opposite phases to each other.

9. The receiving device of claim 8,
wherein the first slope detector comprises a first comparator comprising:
a first polarity input terminal configured to receive the first delayed analog signal,
a second polarity input terminal configured to receive the second delayed analog signal,
a first input terminal configured to receive the delayed clock signal, and
a first output terminal configured to output the first slope type determination signal, and
wherein the second slope detector comprises a second comparator comprising:
a third polarity input terminal configured to receive the second delayed analog signal,
a fourth polarity input terminal configured to receive the first delayed analog signal,
a second input terminal configured to receive the delayed clock signal, and
a second output terminal configured to output the second slope type determination signal.

10. An operating method of a receiving device, the operating method comprising:
delaying an analog signal received from the outside to output a delayed analog signal that is delayed with respect to the analog signal;
outputting, based on a phase compensation code signal and a reference clock signal, a clock signal;
outputting, based on the analog signal and the clock signal, a plurality of digital samples comprising a first digital sample with a first value, a second digital sample with a second value and a third digital sample with a third value;
outputting, based on the clock signal, the analog signal and the delayed analog signal, a slope type determination signal indicating a rising slope or a falling slope of the analog signal;
determining, based on the plurality of digital samples, a curve type indicating a convex curve or a concave curve of a curve comprising the plurality of digital samples;
obtaining, based on the curve type and the slope type determination signal, an evaluation result with respect to a timing of the clock signal; and
outputting, based on the evaluation result, the phase compensation code signal,
wherein, in an eye diagram of the analog signal, the curve type indicates the convex curve based on an open shape of the analog signal being convex and indicates the concave curve based on the open shape of the analog signal being concave, and
wherein the clock signal is configured to sample the open shape of the eye diagram.

11. The operating method of claim 10, wherein the outputting of the slope type determination signal comprises:
receiving the clock signal, the analog signal and the delayed analog signal;
comparing the analog signal with the delayed analog signal at an edge of the clock signal; and
outputting the slope type determination signal, wherein the slope type determination signal comprises a first logic level or a second logic level, wherein the first logic level indicates that a slope type of the analog signal is the rising slope and the second logic level indicates that the slope type of the analog signal is the falling slope.

12. The operating method of claim 10, wherein the outputting of the plurality of digital samples comprises outputting the first digital sample, the second digital sample, and the third digital sample by a first analog-to-digital converter, a second analog-to-digital converter, and a third analog-to-digital converter, respectively, the first analog-to-digital converter, the second analog-to-digital converter, and the third analog-to-digital converter being successively arranged,
wherein, among the first digital sample, the second digital sample and the third digital sample, the second value of the second digital sample is greater than the first value of the first digital sample and greater than the third value of the third digital sample,
wherein the determining of the curve type comprises determining the curve type as the convex curve based on the first digital sample, the second digital sample and the third digital sample.

13. The operating method of claim 10, wherein the outputting of the plurality of digital samples comprises outputting the first digital sample, the second digital sample and the third digital sample by a first analog-to-digital converter, a second analog-to-digital converter, and a third analog-to-digital converter, respectively, the first analog-to-digital converter, the second analog-to-digital converter, and the third analog-to-digital converter being successively arranged,
wherein, among the first digital sample, the second digital sample and the third digital sample, the second value of the second digital sample is less than the first value of the first digital sample and less than the third value of the third digital sample,
wherein the determining of the curve type comprises determining the curve type as the concave curve based on the first digital sample, the second digital sample and the third digital sample.

14. The operating method of claim 10, wherein the obtaining the evaluation result comprises determining that the timing of the clock signal is earlier than optimal timing based on i) the curve type being the convex curve and a slope type is the rising slope, or ii) the curve type being the concave curve and the slope type being the falling slope.

15. The operating method of claim 10, wherein the obtaining the evaluation result comprises determining that the timing of the clock signal is later than optimal timing when: i) the curve type is the convex curve and a slope type is the falling slope, or ii) the curve type is the concave curve and the slope type is the rising slope.

* * * * *